Patented Jan. 6, 1931

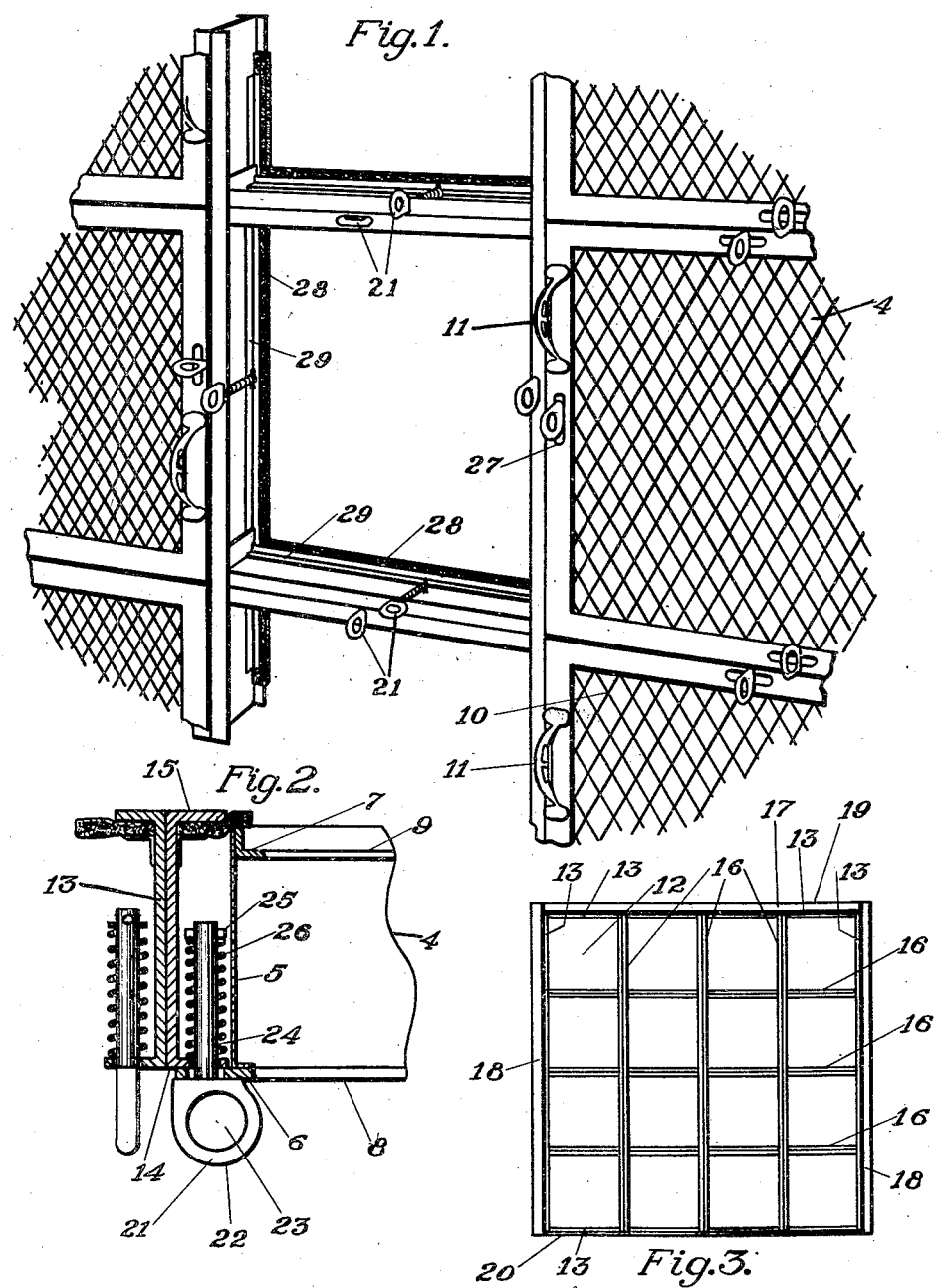

1,788,171

UNITED STATES PATENT OFFICE

JAMES JARVIS PREBLE, OF NEWTON, MASSACHUSETTS; LIVINGSTON STEBBINS, ADMINISTRATOR OF SAID JAMES JARVIS PREBLE, DECEASED, ASSIGNOR, BY MESNE ASSIGNMENTS, TO AMERICAN AIR FILTER COMPANY, OF LOUISVILLE, KENTUCKY, A CORPORATION OF DELAWARE

AIR FILTER

Application filed November 28, 1925. Serial No. 71,967.

The present invention relates to air filters, and more particularly to air filters comprising a plurality of interchangeable filter units.

In many commercial types of air filters each of the interchangeable filter units is surrounded by an auxiliary interchangeable frame. These auxiliary interchangeable frames are shipped as separate units to the point of installation where they are assembled in superposed and laterally operative contact and bolted together to form a bank of filter unit receiving frames within a main frame. This construction is weak because it is difficult, and often impossible, to obtain the proper alignment of the auxiliary frames necessary to impart strength and rigidity to the assembled bank. Moreover, after the bank is assembled and bolted, the joints between the contacting faces of the auxiliary frames must be calked or sealed in order to insure that all the air shall pass through the filtering media of the filter unit and not leak through the frames. These assembling, bolting and sealing operations on the air filter at the place of installation add materially to the cost thereof.

The principal object of the present invention is to provide an air filter of the interchangeable filter unit type with a bank of air-tight, perfectly aligned filter unit receiving frames which may be erected as a unit at the place of installation.

To the accomplishment of this object, and such others as may hereinafter appear, the features of the invention relate to certain devices, combinations and arrangement of parts which possess advantages apparent to those skilled in the art and which will be described hereinafter and then set forth broadly and in detail in the appended claims.

The various features of the present invention will be readily understood from an inspection of the accompanying drawings illustrating the best form of the invention at present devised, in which, Figure 1 is a detail in perspective of a bank of interchangeable filter units and the frames therefor;

Fig. 2 is a detail in sectional plan showing how the interchangeable filter units are secured to the frames, and Fig. 3 is an elevation on a small scale of an air filter installation, the filter units being removed.

The filter unit 4 (Figs. 1 and 2) may be, and preferably is, constructed as shown in my co-pending application filed April 30, 1925, Serial No. 27,033 issued as Patent Number 1,576,121 on March 9, 1926. As shown therein, the filter unit comprises a rectangular box 5 having a front flange 6 and a rear flange 7. The flanges 6 and 7 are provided with the inlet opening 8 and the outlet opening 9, respectively, both of which are covered by an expanded metal cover or screen 10 (Fig. 1). The filtering media (not shown) is arranged inside the box between the covers 10. The flange 6 is also provided with a pair of handles 11 by which the filter unit may be handled in inserting the filter unit into and its removal from one of the rectangular openings 12 in the bank of filter unit frames (Fig. 3).

As shown in Fig. 3 the particular bank selected for the purpose of illustration is designed to hold sixteen filter units. The bank is composed of a series of vertical and cross beams some of which comprise a channel beam 13 (Fig. 2) having a front flange 14 and a rear flange 15 and some of which comprise two channel beams 13 welded back to back to form an I beam 16. Two channel beams 13 and three I beams 16 are arranged as shown in Fig. 3 to form the vertical beams of the bank. Eight channel beams 13 are welded to the vertical beams near their tops and bottoms as shown in Fig. 3 to form the top and bottom rails of the bank. Twelve I beams 16 are welded to the vertical beams, as shown in Fig. 3, to form the cross-beams of the bank.

This construction forms a bank of filter unit receiving frames each of which is provided with a front flange 14 and a rear flange 15. The bank is constructed as described at the place of manufacture and is shipped as a unit to the place of installation. The bank may be readily formed in perfect alignment thus to insure the maximum strength and rigidity when installed. The bank bridges the opening through which the air to be cleaned passes and is held in place therein by a main frame 17 having the two vertical strips 18 and the top horizontal strip 19. These strips prevent air passing between the bank and the walls of the opening.

The filter unit is secured in place within its particular surrounding frame by four spring latches 21 (Fig. 2) two of which are carried by the front flanges 14 on the vertical beams and two of which are carried by the front flanges 14 on the cross-beams. Each latch comprises a head 22, having a finger opening 23, and a shank 24. Coiled around the shank 24 and interposed between the rear faces on the front flanges 14 of the beams and a pin 25 on the shank 24, is a spring 26. The flange 6 on each filter unit is provided with four elongated slots 27 which loosely fit over the heads 22 when the filter unit is placed in position within one of the rectangular openings 12. By inserting a finger into the opening 23 the head 22 may be drawn through the slot 27 thus tensioning the spring 26. A quarter turn is then given the head 22 which is released to cause it to engage the flange 6 and permit the tensioned spring 26 to pull the flange 6 tightly against the external faces of the front flanges 14 on the beams.

In order to provide an air-tight joint between the rear corner edges of the box 5 and the adjacent internal faces of the rear flanges of the vertical and cross-beams, the beams carry a strip of felting 28 interposed between said faces and a bracket strip 29 secured to the beams. The felting 28 is wider than the width of the rear flanges 15 so that when the filter unit is inserted in place the rear corner edges of the box 5 engage the loose part of the felting 28 and compress it against the edge face of the rear flange 15 thus to form an air-tight joint between the box and the rear flanges 15. Stated in another way, a portion only of the area of the strip of flexible material is rigidly secured to the frame between the rear flanges 15 and the bracket strip 29 thus leaving an edge portion of the strip free to flex between the frame and the filter unit cell.

With this construction the bank is formed in the place of manufacture and is assembled as a unit at the place of installation. The cost of the assembly is consequently reduced to a minimum and a strong, rigid construction insured. As the channel beams 13 are welded back to back to form the I beams 16 the centrally located beams which form a frame for two adjacent filter units are air-tight and therefore do not require a calking or similar sealing operation to prevent air leakage. By providing the beams of the bank with the spring latches and the filtering units with the cooperating slots, the filter units may be handled in cleaning them or in charging the filtering media thereof with oil without danger of bending or breaking the spring latches which are left in place in the bank. The latches on the beams pull the flange 6 of the filter unit against the external faces of the front flanges 14 and also pull the rear edges of the box 5 against the felting 28 thus to insure a double seal for the front and back of the filter unit. The felting strip 28 permits considerable tolerance in the manufacture of the interchangeable boxes 5 or the relative spacing between the flanges 14 and 15. If the rear face of the box 5 were provided with a flange constructed to engage the inside faces of the flange 15, great care would have to be exercised in constructing all the boxes and all the beams exactly alike because it would be necessary, to obtain an air-tight joint, for the front and rear flanges on each box to simultaneously engage and seat on the flanges 14 and 15, respectively. By interposing the felting strip 28 between the flanges 15 and the rear corner edges of the box 5 provision is made for automatically taking-up a reasonable manufacturer's tolerance in the construction of the interchangeable boxes or the beams provided with the flanges 14 and 15.

What is claimed as new, is:

1. An air filter having, in combination, a frame comprising a series of connected beams each having front and rear flanges, a filter unit comprising a box having a flange on its front face constructed and arranged to engage the external faces on the front flanges of the beams, and material carried by the rear flanges and having a width greater than the rear flanges whereby the material is interposed between the internal faces on the rear flanges of the beams and the rear corner edges of the box forming an air-tight joint between the filter unit and its frame.

2. An air filter having, in combination, a filter unit comprising a box having a flange on its front face provided with a series of slots, a frame surrounding the box composed of beams having front flanges, and spring latches carried by the beams constructed to extend through the slots and pull the flange on the box against the external faces on the front flanges of the beams.

3. An air filter having, in combination, a filter unit comprising a box having a flange on its front face provided with a series of slots, a frame surrounding the box composed of beams having front and rear flanges, material interposed between the rear corner edges of the box and the internal faces on the rear flanges of the beams to form an air-tight joint, and spring latches carried by the beams constructed to extend through the slots and pull the flange on the box against the external faces on the front flanges of the beams.

4. An air filter having, in combination, a filter unit comprising a box having a flange on its front face provided with a series of slots, a frame surrounding the box composed of beams having front and rear flanges, compressible material interposed between the rear corner edges of the box and the internal faces on the rear flanges of the beams to form an air-tight joint, and spring latches carried by the front flanges of the beams provided with heads constructed to extend through the slots and pull the flange on the box against the external faces of the front flanges of the beams.

5. An air filter having, in combination, a plurality of interchangeable filter units, a plurality of spaced vertical beams having front and rear flanges, a plurality of spaced cross-beams, having front and rear flanges, secured to the vertical beams for dividing the space between the vertical beams into rectangular openings in each of which one of the filter units is inserted, and means for sealing the joints between the filter unit and the beams.

6. An air filter having, in combination, a plurality of interchangeable filter units, a plurality of spaced vertical beams having front and rear flanges, a plurality of spaced cross-beams, having front and rear flanges, secured to the vertical beams for dividing the space between the vertical beams into rectangular openings in each of which one of the filter units is inserted, means for securing the filter units to the beams, and means for sealing the joints between the filter units and the front and rear flanges on the beams.

7. An air filter having, in combination, a frame comprising a series of connected members each having front and rear flanges, a filter unit comprising a box having a flange on one face constructed and arranged to engage one face on one of the flanges of the members, and means interposed between the corner edges of the box on the face opposite the flanged face and the flange on the member other than the one engaged by the flange on the box forming an automatic take-up airtight joint between the filter unit and its frame.

8. In an air filter, the combination with a unit filter cell and a surrounding frame, of a gasket, carried by the frame, adapted to prevent leakage between said cell and its surrounding frame, said gasket comprising a strip of flexible material having one edge free to flex between said frame and cell.

9. In an air filter, the combination with a unit filter cell and a surrounding frame having rear flanges which extend in close proximity to the side faces of the cell but which leave an appreciable space therebetween, of a gasket, carried by the frame adapted to prevent leakage between said cell and its surrounding frame, said gasket comprising a strip of flexible material wider than the width of the rear flanges whereby one edge of the material overlaps the flanges and is free to flex between said frame and cell.

10. In an air filter comprising a unit filter cell and surrounding frame, a gasket adapted to prevent leakage between said cell and its surrounding frame, said gasket comprising a strip of flexible material having a substantial portion of its area rigidly secured to said frame, but having an edge free to flex between said frame and cell.

In testimony whereof I have signed my name to this specification.

JAMES JARVIS PREBLE.